United States Patent [19]

Horiuchi et al.

[11] Patent Number: 4,711,135
[45] Date of Patent: Dec. 8, 1987

[54] VIBRATION DAMPING STRUCTURE OF SHIFT LEVER RETAINER

[75] Inventors: Yusuke Horiuchi; Masaki Inui, both of Toyota, Japan

[73] Assignee: Toyota Jidosha Kabushiki Kaisha, Japan

[21] Appl. No.: 800,048

[22] Filed: Nov. 20, 1985

[30] Foreign Application Priority Data

Dec. 10, 1984 [JP] Japan .................. 59-187866[U]

[51] Int. Cl.⁴ .................................................. G05G 9/12
[52] U.S. Cl. ................................. 74/473 R; 74/491; 248/635; 248/638
[58] Field of Search ................... 74/473 R, 491, 523; 248/632, 635, 583, 638

[56] References Cited

U.S. PATENT DOCUMENTS

| | | | |
|---|---|---|---|
| 2,138,176 | 11/1938 | Keys | 248/635 |
| 2,520,757 | 8/1950 | Cain | 248/632 |
| 3,220,676 | 11/1965 | Butts | 248/635 |
| 3,430,901 | 3/1969 | Cauvin | 248/632 |
| 3,899,934 | 8/1975 | Froumajou | 74/491 |
| 4,050,325 | 9/1977 | Shishido | 74/473 R |
| 4,065,082 | 12/1977 | Oota | 248/632 |
| 4,306,708 | 12/1981 | Gassaway et al. | 248/635 |
| 4,311,204 | 1/1982 | Shupert | 248/632 |
| 4,364,450 | 12/1982 | Kemp et al. | 74/473 R |
| 4,606,238 | 8/1986 | Ikemoto et al. | 248/638 |

FOREIGN PATENT DOCUMENTS

| | | | |
|---|---|---|---|
| 91617 | 10/1983 | European Pat. Off. | 74/473 R |
| 2719468 | 11/1977 | Fed. Rep. of Germany | 248/635 |

*Primary Examiner*—Cornelius J. Husar
*Assistant Examiner*—Peter M. Cuomo
*Attorney, Agent, or Firm*—Parkhurst & Oliff

[57] ABSTRACT

Disclosed herein in a mount structure where a shift lever retainer for spherically supporting a shift lever is mounted through a vibration damping member to a transmission case by a bolt, a vibration damping structure comprising a stopper means for preventing horizontal and vertical deformations of the vibration damping member greater than a predetermined amount. With this arrangement, there is no possibility that rigid feeling in operating of the shift lever is decreased, that is, shift feeling is deteriorated. Further, vibration of the shift lever and associated noise may be greatly reduced.

2 Claims, 8 Drawing Figures

VIBRATION DAMPING STRUCTURE OF SHIFT LEVER RETAINER

BACKGROUND OF THE INVENTION (1) Field of the Invention

This invention relates to a vibration damping structure of a shift lever retainer.

(2) Description of the Prior Art

Generally, there is a problem in a shift lever mount structure of a direct shift type manual transmission that vibration from a power unit consisting of an engine, clutch and transmission or vibration due to backlash of gears in the transmission is transmitted from a transmission case through a shift lever retainer to a shift lever thereby causing inconvenient vibration of the shift lever or generating noise.

To prevent such a problem in the prior art, it has been proposed that a rubber sheet is interposed between the shift lever retainer and the transmission case as disclosed in Japanese Utility Model Laid-open No. 57-3035, or it has been also proposed that a vibration damping rubber is inserted in the shift lever.

However, in such a conventional method, supporting rigidity of the shift lever is decreased within a range where a rubber sheet inserted between the shift lever retainer and the transmission case is deformed to cause bad influence upon shift feeling. Even when it is intended to obtain vibration damping effect within a range where the shift feeling is not badly influenced, satisfactory vibration damping effect may not be attained because a thickness of the rubber sheet cannot be so reduced.

SUMMARY OF THE INVENTION

It is an object of the present invention to provide a vibration damping structure of a shift lever retainer which may allow rigid feeling in operating of a shift lever not to be decreased, that is, shift feeling not to be deteriorated.

It is another object of the present invention to provide a vibration damping structure of a shift lever retainer which may greatly reduce vibration of the shift lever and associated noise.

According to the present invention, in a mount structure where a shift lever retainer for spherically supporting a shift lever is mounted through a vibration damping member to a transmission casing by a bolt, a vibration damping structure comprises a stopper means for preventing horizontal and vertical deformations of the vibration damping member greater than a predetermined amount.

The invention will be more fully understood from the following detailed description and appended claims when taken with the drawings.

DETAILED DESCRIPTION OF THE PREFERRED EMBODIMENT

Figure 1:
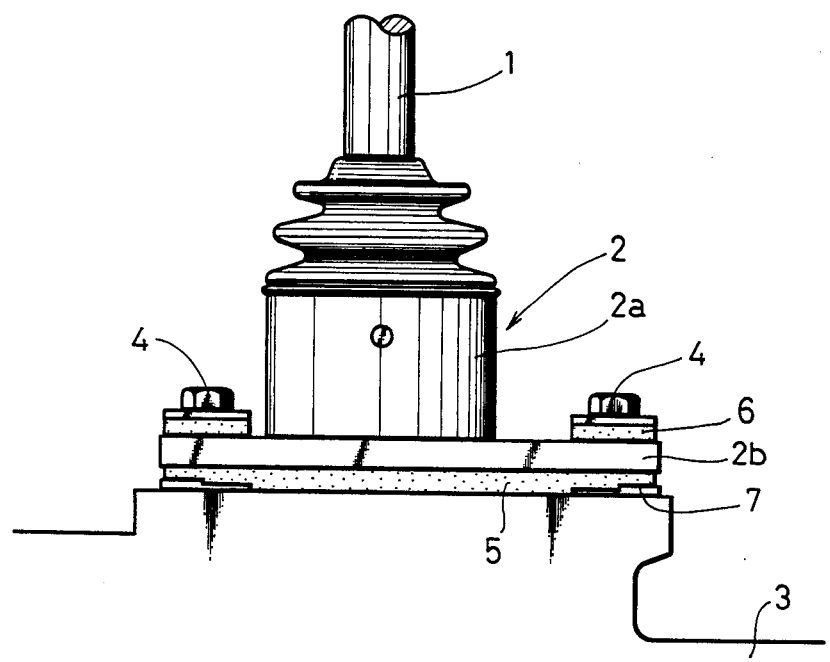
FIG. 1 is a side view of the mount structure of the shift lever, shift lever retainer and transmission case in a preferred embodiment of the invention.

Referring to FIG. 1, reference numeral 1 designates a shift lever which is connected to a large spherical surface portion (not shown) provided in a shift lever retainer 2. The large spherical surface portion is spherically supported by a support member fixed to the shift lever retainer 2.

The shift lever retainer 2 is constituted of a retainer body 2a for supporting the large spherical surface portion and a mount portion 2b formed at a lower portion of the retainer body 2a to be mounted to a transmission case 3.

The mount portion 2b is rectangularly formed, and has bolt holes 2c for receiving bolts 4 at four corners.

Figure 2:
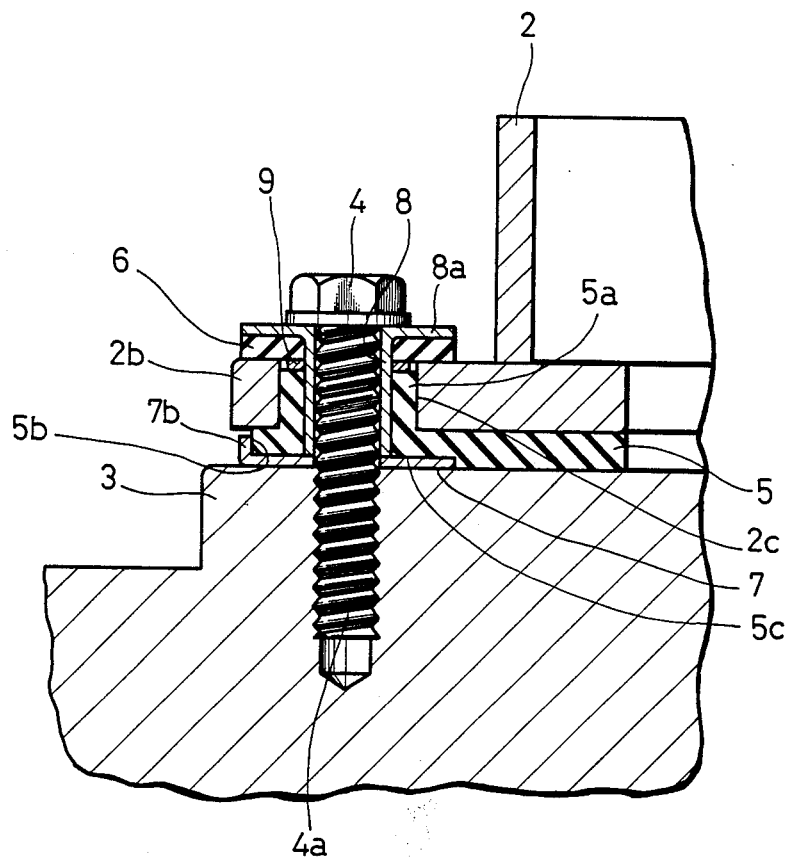
FIG. 2 is a vertical sectional view of a peripheral portion of a bolt in FIG. 1.
Figure 5A:
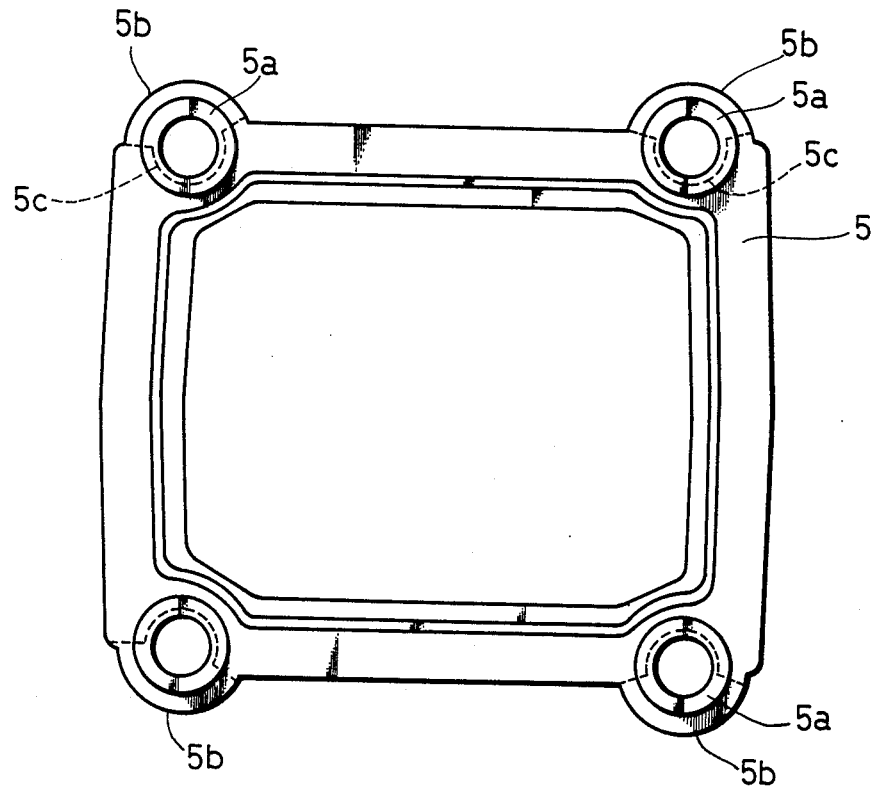
FIG. 5A is a plan view of a vibration damping sheet.
Figure 5B:
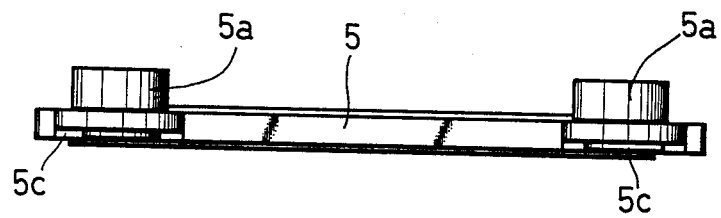
FIG. 5B is a side view of the vibration damping sheet in FIG. 5A.

As shown in FIG. 2, the bolt hole 2c has a diameter greater than that of a thread portion 4a of the bolt 4. A vibration damping sheet 5 as shown in FIG. 5A is interposed between the shift lever retainer 2 and the transmission case 3. Further, a vibration damping ring 6 is interposed between the mount portion 2b and the bolt 4.

As shown in FIG. 5A, the vibration damping sheet 5 is rectangularly formed, and has a central opening. A periphery of the mount portion 2b is supported by the vibration damping sheet 5. The vibration damping sheet 5 is integrally formed with cylindrical support portions 5a inserted in the bolt holes 2c at four corners. The vibration damping sheet 5 is made of preferably rubber, and has a thickness sufficient for absorbing vibration from the transmission case.

Figure 4A:
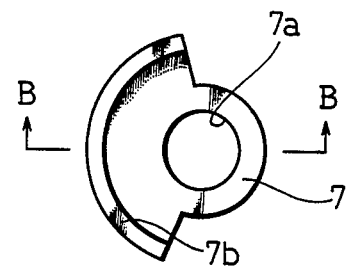
FIG. 4A is a plan view of a plate.
Figure 4B:
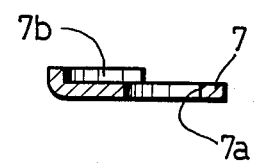
FIG. 4B is a cross-section taken along the line B—B in FIG. 4A.

There are provided plates 7 under the vibration damping sheet 5. As shown in FIGS. 4A and 4B, the plate 7 is formed in a substantially fan-like shape, and has circular holes 7a for receiving the thread portion 4a at a central portion thereof. A fan-like portion of the plate 7 is formed with a L-shaped portion 7b at an end thereof.

The plates 7 are inserted between the vibration damping sheet 5 and the transmission case 3, and under this condition, the L-shaped portions 7b act to retain end portions 5b of the vibration damping sheet 5 to prevent movement of the same.

As shown by a dotted line in FIG. 5A, there is formed fan-like insertion space 5c for receiving the plates 7 on the lower portion of the vibration damping sheet 5.

Figure 3A:
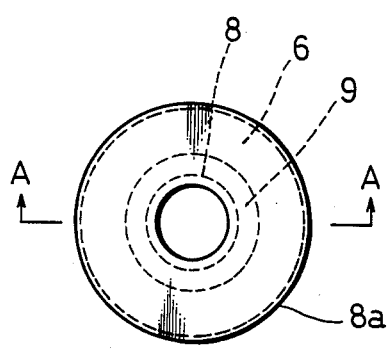
FIG. 3A is a plan view of a vibration damping ring, bushing and stopper as assembled.
Figure 3B:
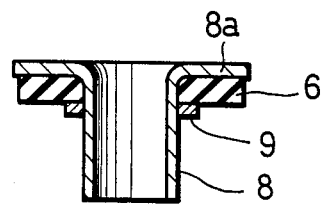
FIG. 3B is a cross-section taken along the line A—A in FIG. 3A.

Referring to FIGS. 3A and 3B, a cylindrical bushing 8 is formed with a flange 8a abutting against the vibration damping ring 6 at one end thereof. The vibration damping ring 6 is also made of preferably rubber. A ring-like stopper 9 made of rigid material such as metal is engaged with the bushing 8, and abuts against a lower surface of the vibration damping ring 6.

As is mentioned above, the vibration damping sheet 5 is interposed between the shift lever retainer 2 and the transmission case 3, and the bolts 4 are fixed through the vibration damping ring 6 to the transmission case 3. Accordingly, the shift lever retainer 2 is not directly contacted with the transmission case 3, that is, it is in a full floating position as separated from the transmission case 3.

Under such a condition as above, vibration from the transmission case 3 is absorbed by the vibration damping sheet 5 and the vibration damping ring 6, and such vibration is not almost transmitted to the shift lever retainer 2. Therefore, it is possible to greatly reduce vibration of the shift lever 1.

There will occur a problem that a rigid feeling in shifting operation of the shift lever 1 is decreased by deformation of the vibration damping sheet 5 or the vibration damping ring 6 due to the full floating construction. However, according to the invention, since there are provided the stoppers 9 and the L-shaped portions 7b, it is possible to effectively prevent decreases in the rigid feeling.

In other words, referring to FIG. 2, when a leftward force for example is applied to the shift lever retainer 2 by the shifting operation of the shift lever 1, the support portion 5a is deformed to move the shift lever retainer 2 leftwardly. However, since there is provided the stopper 9, an outer circumference of the stopper 9 comes into abutment against an inner circumference of the bolt hole 2c of the shift lever retainer 2 thereby to restrict excessive leftward movement of the shift lever retainer. As the stopper 9 is formed in a ring-like shape, movements of the retainer 2 in the other horizontal directions are similarly restricted.

Further, the L-shaped portion 7b of the plate 7 is provided at the end portion 5b of the vibration damping sheet 5 with a predetermined space defined between the L-shaped portion 7b and the mount portion 2b. Therefore, even when the vibration damping sheet 5 is vertically deformed by an external force, the L-shaped portion 7b comes into abutment against the mount portion 2b to prevent excessive deformation of the vibration damping sheet 5.

Thusly, according to the invention, it is possible to greatly reduce vibration of the shift lever and associated noise without decreasing rigid feeling, that is deteriorating shift feeling in operating of the shift lever.

Having thus described the preferred embodiments of the invention, it should be understood that numerous structural modifications and adaptations may be restored to without departing from the spirit of the invention.

What is claimed is:

1. In a shift lever retainer mounting structure including a shift lever retainer for spherically supporting a shift lever, a first vibration damping member interposed between said shift lever retainer and a transmission case, a bolt for fixing said shift lever retainer to said transmission case, a second vibration damping member interposed between said bolt and said shift lever retainer, and a bushing for receiving said bolt, said bushing having an upper flange arranged between a head portion of said bolt and said second vibration damping member, said first and second vibration damping members having a thickness such that vibration from said transmission case may be sufficiently absorbed;

a vibration damping structure comprising a first stopper means for preventing horizontal deformation of said first vibration damping member greater than a predetermined amount, and a second stopper means for preventing vertical deformation of said first vibration damping member greater than a predetermined amount, wherein said first stopper means comprises a rigid ringlike member engaged with said bushing and located between said first and second vibration damping members, and wherein said second stopper means comprises an upward projection projecting from a plate engaged with said bolt and fixed on an upper surface of said transmission case such that a portion of said plate is interposed between said first vibration damping member and said transmission case.

2. The vibration damping structure as defined in claim 2, wherein said plate is formed in a substantially fan-like shape.

* * * * *